US009092564B2

(12) United States Patent
Wischik et al.

(10) Patent No.: US 9,092,564 B2
(45) Date of Patent: Jul. 28, 2015

(54) CALL STACKS FOR ASYNCHRONOUS PROGRAMS

(71) Applicant: Microsoft Corporation, Redmond, WA (US)

(72) Inventors: Lucian Wischik, Seattle, WA (US); Eric Feiveson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 13/768,972

(22) Filed: Feb. 15, 2013

(65) Prior Publication Data

US 2014/0237452 A1   Aug. 21, 2014

(51) Int. Cl.
*G06F 9/44* (2006.01)
*G06F 11/36* (2006.01)

(52) U.S. Cl.
CPC .......... *G06F 11/3624* (2013.01); *G06F 9/4425* (2013.01); *G06F 11/3632* (2013.01); *G06F 11/3636* (2013.01)

(58) Field of Classification Search
None
See application file for complete search history.

(56) References Cited

U.S. PATENT DOCUMENTS

| | | | |
|---|---|---|---|
| 5,483,633 | A | 1/1996 | Johnson |
| 7,539,974 | B2 | 5/2009 | Beck et al. |
| 7,631,304 | B2 | 12/2009 | Bearman et al. |
| 8,458,681 | B1 * | 6/2013 | Coutant et al. ................. 717/151 |
| 8,539,452 | B2 * | 9/2013 | Chapman et al. ............. 717/127 |
| 2006/0101405 | A1 * | 5/2006 | Buschardt et al. ............ 717/124 |
| 2007/0277165 | A1 * | 11/2007 | Stall et al. ..................... 717/146 |
| 2008/0320437 | A1 * | 12/2008 | Maennel ........................ 717/105 |
| 2010/0318852 | A1 * | 12/2010 | Zheng et al. ..................... 714/37 |
| 2011/0107307 | A1 * | 5/2011 | Liu et al. ........................ 717/125 |
| 2011/0154300 | A1 * | 6/2011 | Rao et al. ....................... 717/133 |
| 2011/0167248 | A1 | 7/2011 | Gafter et al. |
| 2011/0239186 | A1 * | 9/2011 | Zinkovsky et al. ........... 717/107 |
| 2011/0258608 | A1 * | 10/2011 | Li et al. .......................... 717/127 |
| 2011/0276983 | A1 * | 11/2011 | Syme et al. .................... 719/314 |
| 2012/0110553 | A1 * | 5/2012 | Bates et al. .................... 717/129 |
| 2012/0210332 | A1 | 8/2012 | Zhao et al. |

(Continued)

OTHER PUBLICATIONS

Arnold et al., "Stack Trace Analysis for Large Scale Debugging," 2007, IEEE, Parallel and Distributed Processing Symposium, pp. 1-10.*

(Continued)

*Primary Examiner* — Thuy Dao
*Assistant Examiner* — Stephen Berman
(74) *Attorney, Agent, or Firm* — Kevin Sullivan; Kate Drakos; Micky Minhas

(57) ABSTRACT

Embodiments provide call stacks for asynchronous programming. A set of all asynchronous call stacks is found by first identifying all threads and all outstanding tasks that have not yet been completed. Optionally, all outstanding continuation-delegates or lambdas that are in the windows queue waiting to be scheduled and/or all outstanding delegates or lambdas in a language-specific queue are also identified. Next, for each thread, identify whether it was invoked by a continuation-callback and, if so, find the corresponding task/promise. Next, given a task/promise, identify the logical parent task/promise. Optionally, given a delegate or lambda, identify its logical parent task/promise. The sequence of logical tasks/promises constitutes an asynchronous call stack in a program. Further information may optionally be retrieved to make the asynchronous call stack more useful. Finally, given a task/promise, identify the corresponding line number and location in source code.

13 Claims, 5 Drawing Sheets

(56) References Cited

U.S. PATENT DOCUMENTS

| | | | |
|---|---|---|---|
| 2012/0259793 A1 | 10/2012 | Umansky et al. | |
| 2012/0266144 A1 | 10/2012 | Halliday et al. | |
| 2012/0311540 A1* | 12/2012 | Fanning et al. | 717/127 |
| 2013/0086425 A1* | 4/2013 | Choi et al. | 714/32 |

OTHER PUBLICATIONS

Buhr et al., "KDB: a multi-threaded debugger for multi-threaded applications," 1996, Proceedings of the SIGMETRICS symposium on Parallel and distributed tools, pp. 80-87.*

Keen et al., "Exception Handling during Asynchronous Method Invocation," 2002, Euro-Par 2002 Parallel Processing Lecture Notes in Computer Science, vol. 2400, 2002, pp. 656-660.*

"International Search Report & Written Opinion for PCT Patent Application No. PCT/US2014/015466", Mailed Date: May 16, 2014, Filed Date: Feb. 10, 2014, 16 pages.

Stasyuk, Andrew, "Async Programming—Async Causality Chain Tracking", Published on: Feb. 1, 2013, Available at: http://msdn.microsoft.com/en-us/magazine/jj891052.aspx.

"Continuation—From Wikipedia, the Free Encyclopedia", Published on: Feb. 7, 2013, Available at: http://en.wikipedia.org/w/index.php?title=Continuation&oldid=537127716.

"Asynchronous Programming with Async and Await (C# and Visual Basic)", Published on: Dec. 31, 2012, Available at: http://msdn.microsoft.com/en-us/library/vstudio/hh191443(v=vs.110).aspx.

Koehnemann, et al., "Runtime Control of Ada Rendezvous for Testing and Debugging", In Proceedings of the Twenty-Fourth Annual Hawaii International Conference on System Sciences, vol. 2, Jan. 8, 1991, pp. 196-204.

Chadha, Rohit et al., "Deciding Branching Time Properties for Asynchronous Programs," In Journal of Theoretical Computer Science, vol. 410, Issue 42, Sep. 28, 2009, (22 pages).

Bray Brandon, "Async in 4.5: Worth the Await," .NET Framework Blog, Apr. 3, 2012 (9 pages).

* cited by examiner

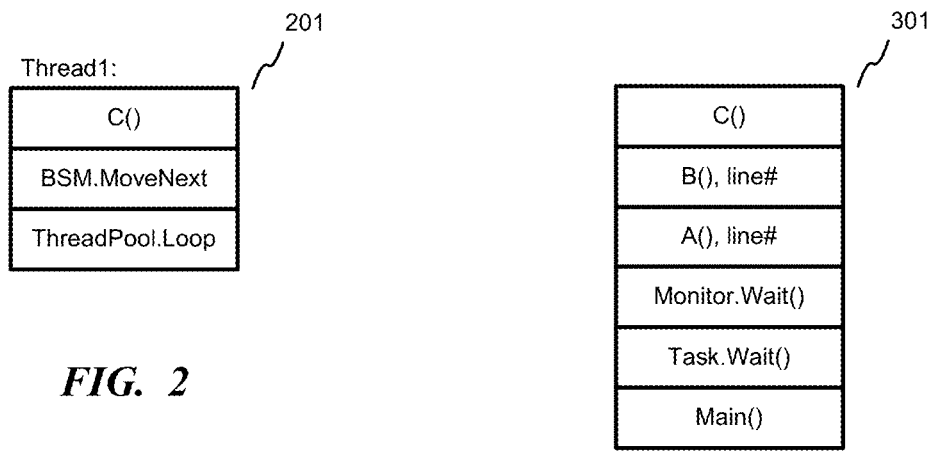
FIG. 2
FIG. 3
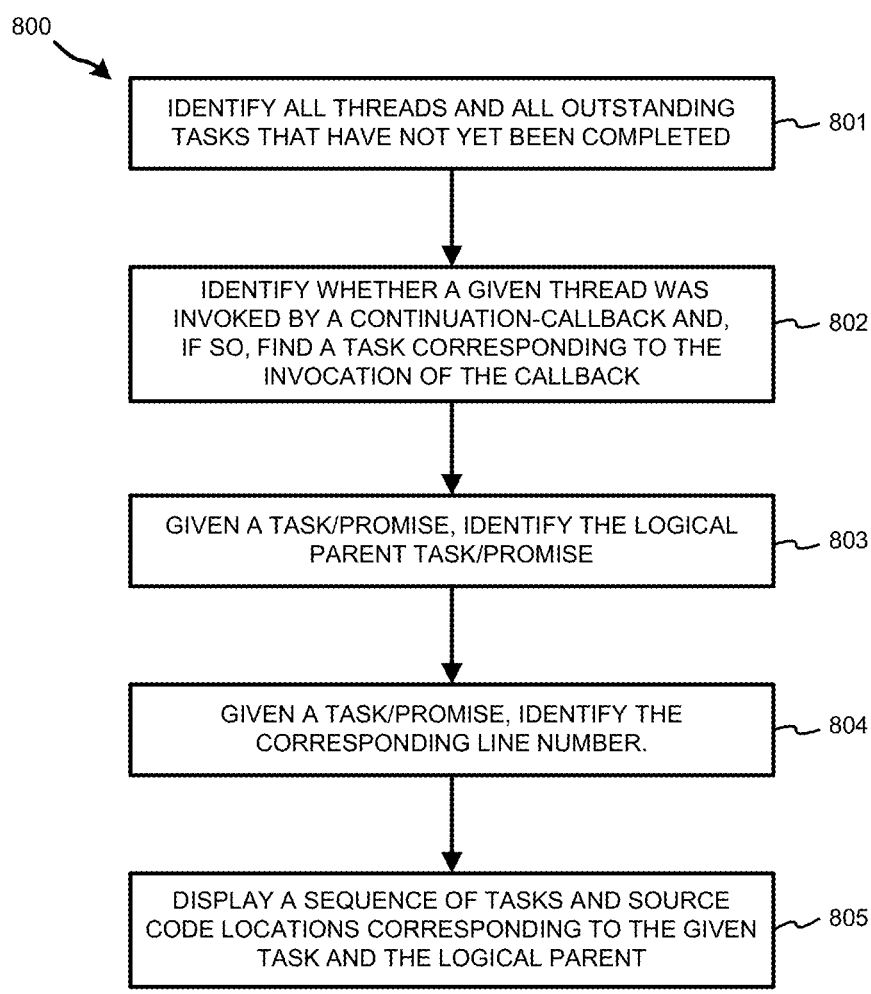
FIG. 8

CALL STACKS FOR ASYNCHRONOUS PROGRAMS

BACKGROUND

When debugging a program or when analyzing a crash-dump, a developer wants to know where the program is at in its execution. This problem is well-understood and solved for traditional, synchronous programs using traditional call stacks. However, many programmers are moving to asynchronous (async) programming. In asynchronous programming, synchronous call stacks do not accurately provide information about where the program is and how it got there.

Debugging tools or error-reporting-tools may identify which sequence of method-invocations led to a given place within code execution ("ultimate causes"), and where those method invocations were. In traditional synchronous programs, methods exist to obtain synchronous call stacks, which provide a way to tell where the synchronous code will return and in what sequence. Traditional synchronous call stacks are useful because "where code will return" is usually adjacent to "where code was invoked" and because the sequence of returns is usually the opposite of the sequence of invocations. Accordingly, a traditional synchronous call stack is a good proxy for what users, such as developers, want to know when analyzing code. However, in asynchronous programs, the use of traditional synchronous call stacks is no longer a good proxy for what the user wants to know because they typically do not show the ultimate cause within a program, such as a method that kicked off a long-running task.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention provide techniques to obtain asynchronous call stacks on a variety of languages and libraries. The asynchronous call stack may be displayed to a developer as an alternative for traditional synchronous call stacks. The asynchronous call stack is used to identify where the program is its execution. These techniques for obtaining the asynchronous call stack work for promise-based async libraries, such as WinJS.Promise, PPLTasks, and .NET Task. The asynchronous call stack technique also will work with cross-language asynchronous call stacks.

For languages that have an "await" operator (or callcc, or iterator methods, or other techniques to reify the current position within a block of code), then greater fidelity can be obtained.

On a developer machine, a debugging tool may connect to a debugee program and analyze the asynchronous call stack. The debugging tool may also connect to a crash dump and analyze the asynchronous call stack. On a user-machine, an error-reporting tool does asynchronous call stack analysis in order to prepare a crash-dump with additional information. A list of "async frames" is created with the following information on each frame: a list of async frames that are logical parents for this async frame and a program counter (in C++ or .Net) or method-name and line-number (in Javascript) of the async frame. Additionally, an optional stacktrace gathered at time of job creation and/or an optional local-variable closure, such as a pointer to a state-machine object in heap (.NET) or a pointer to delegate closure (C++/JS/.Net), or pointer to EBP/ESP (.NET/C++), may be included in the async frame.

In one embodiment, the asynchronous call stacks are generated using the following steps.

First, identify all threads and all outstanding tasks that have not yet been completed. Optionally, also identify all outstanding continuation-delegates that are in the windows queue waiting to be scheduled and/or all outstanding delegates in a language-specific queue.

Second, identify whether a given thread was invoked by a continuation-callback method, and if so, find the corresponding task/promise.

Third, given a task/promise, identify the logical parent task/promise. Optionally, given a "delegate" in .NET ("lambdas" or "closures" in C++, "function objects" in Javascript, etc.), identify the logical parent task/promise. Given a task/promise, identify threads that are synchronously blocked on it.

Fourth, given a task/promise, identify the corresponding line number. Optionally, also identify the local-variable-closure, and/or also retrieve the synchronous call stack at time of task/promise creation.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 2 illustrates the call stack that is available when an exception occurs in C.

FIG. 3 illustrates the type of call stack information that a developer would like to see in one embodiment.

FIG. 8 is a flowchart of a method or process for generating an asynchronous call stack for an asynchronous program.

DETAILED DESCRIPTION

Embodiments of the invention include techniques to obtain asynchronous call stacks on a variety of languages and libraries.

Call stacks can be used to identify where a program is in its execution. Such information may be provided to a developer, for example, via a debugger tool. A call stack may be defined as the series of method calls leading from the beginning of the program to the statement currently being executed at run time. This definition of call stack is valid for a traditional, single-threaded, synchronous programming model. However, the definition does not necessarily fit programming models using parallelism and asynchrony. Instead, asynchronous call stacks are created for asynchronous programming.

Figure 1:
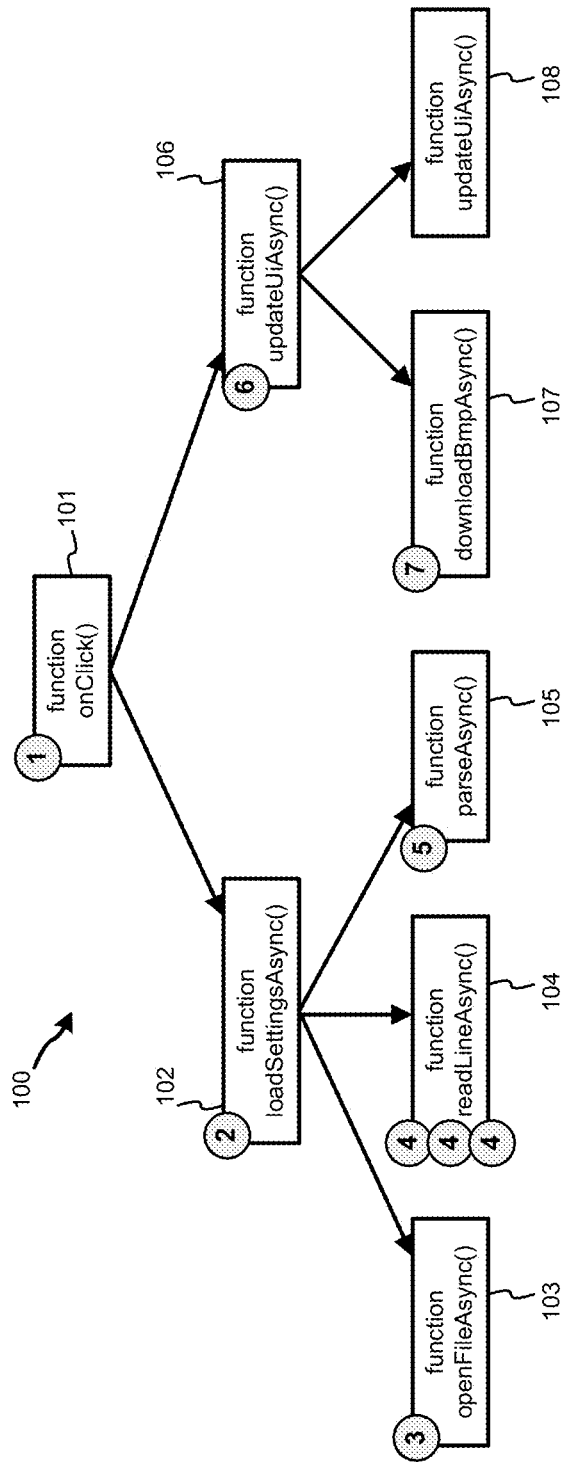
FIG. 1 illustrates a program that starts with a synchronous method and includes asynchronous methods.

FIG. 1 illustrates a program 100 that starts with method 101 and includes asynchronous (async) methods 102-108. The circled numbers 1-7 show a sequence of calls that have been performed so far. The program is currently at function 107. If a developer wants to know how the program 100 got to method 107, such information is not usually available when debugging an async program. If a log was kept of all method calls, then the developer would have the entire program history (i.e., 1→2→3→4→4→4→5→6→7), which is not necessarily the information desired by the developer. Instead, the developer generally wants to know the sequence of calls that lead from the start of the program to the current position at method 107 (i.e., 1→6→7). If the diagram had been of synchronous method calls, then the traditional call stack would show the sequence 1→6→7, as desired. However, since the method calls in this diagram are asynchronous, it does not show this sequence.

However, program 100 does keep track of where each call will return to (i.e., 7→6→1). The method that the program will return to is typically adjacent to where the call was made. This information may be used as a good proxy for the sequence of calls that lead to the current place within the program's execution, which is information that a developer wants.

In another example, after method 107 completes, the program 100 will return to method 106. Once in method 106, the traditional synchronous call stack will only show that the program arrived at method 106 from method 107. However, the user really needs to know how async method 106 relates to method 101.

A traditional call stack in a synchronous program is created by reading the Extended Base Pointer (EBP) and Extended Stack Pointer (ESP) and using knowledge of how the pointers are laid out in the standard calling convention. This technique can be extended to asynchronous programs. However, rather than reading EBP and ESP, the asynchronous call stack in the asynchronous program requires reading from heap memory and relying using knowledge of how certain heap objects are laid out in the various standard task/promise libraries. This can be used to display information to a developer while debugging a program or can be collected for a crash dump of a running program.

Here, information is stored in a different way for the async methods compared to traditional synchronous programming. Information may be stored on the heap or other objects that indicates what is going to happen to the program after function 106 completes. The asynchronous call stack process goes into those objects and determines that function 101 will resume after function 106 completes. Additionally, further analysis will identify exactly where in function 101 the program will resume. It is also possible to determine what the local variables inside of function 101 that have been saved for the continuation of function 101.

There are several parts to gathering the asynchronous call stack. First, all threads and all outstanding tasks that have not yet been completed are identified. In some embodiments, all outstanding continuation-delegates in the Windows® queue that are waiting to be scheduled are also identified. Additionally, outstanding delegates in a language-specific queue may also be identified.

After identifying all threads and the outstanding tasks, it is determined whether a given thread is inside a continuation-callback and, if so, the corresponding task/promise is identified.

Given a task/promise, the logical parent task/promise is identified. If delegates have been found, then given a delegate, the logical parent task/promise is identified for that delegate.

In other embodiments, given a task/promise, threads that are synchronously blocked on the task/promise are identified.

Also, given a task/promise, the corresponding line number in the program is identified. In other embodiments, the local-variable-closure is also identified. The synchronous call stack at time of task/promise creation may also be retrieved.

Example uses for the asynchronous call stack data include debugging of a program by a developer using an integrated development environment (IDE) or debugger tool—i.e., a live debugger running a on a developer's machine with program databases (PDBs). In other embodiments, error reporting from deployed applications may include crash dump data that was collected using similar techniques.

The asynchronous call stack analysis works for error-report gathering on a user machine at the time a program crashes, such as an error-report-gatherer running on a user machine without PDBs. Error reporting may extract key information from the crash-dump, such as a call stack and asynchronous call stack data, which can be sent to the developer for use in analyzing the program.

There may be enough metadata in memory on a user's machine to identify function-names, such as in .NET and Javascript. However, in other languages, such as C++ there is not enough metadata. In this case, a technique referred to as "PDB-Lite" may be used.

The standard library ppltasks.h would contain:

```
#pragma data_seg(".pdblite")
DWORD64 method_addr=0;
#pragma data_seg( )
method_addr = &Concurrency::details::_TaskCollection::_RunAndWait;
```

This way, at error-report gathering time, the developer can examine the crash-dump, find the address of the small number of key functions, and walk the asynchronous call stack with it.

The heap memory is read to reconstruct the asynchronous call stack for different languages, such as Javascript (WinJS.Promise), C++(ppltasks.h), and Visual Basic® (VB)/C# (async/Task).

In the first step, the asynchronous call stack process identifies all outstanding tasks.

In one embodiment, an API is used for retrieving all outstanding job-identifiers for jobs from all languages. This API is callable at error-report gathering time. For example:

List<AsyncJobId> GetOutstandingAsyncJobs( );

Each language component goes from an AsyncJobId to a pointer to the corresponding task/promise object in memory.

In .NET, it is impossible to store pointers in the WinRT Job database, because garbage collection renders those pointers meaningless. There are two possibilities for identifies all outstanding tasks. First, at the expense of runtime overhead cost, a weak table from job-ids to Task references may be maintained. Second, at error-reporting time, use existing ICorDebug interfaces to scan the entire heap for tasks.

In Javascript and C++, neither of these languages uses a relocating garbage collector. Therefore, when the Javascript or C++ runtimes log the creation of a task/promise, they log the address of that task/promise object.

In some embodiments, outstanding delegates waiting to be scheduled are also identified.

In the following example code, an outstanding async operation ("GetFilesAsync") will complete, and its continuation-delegate will get posted to the Dispatcher's queue, but will never be executed:

```
DispatchedHandler lambda = null; lambda = delegate {
    Dispatcher.RunAsync(CoreDispatcherPriority.High, lambda);
};
lambda( );
await KnownFolders.DocumentsLibrary.GetFilesAsync( );
new Windows.UI.Popups.MessageDialog("hello").ShowAsync( );
```

This scenario also applies to the Windows® threadpool and the .NET threadpool. A list of all such scheduling-starved delegates may be gathered in addition to outstanding tasks.

In the second step, the asynchronous call stack process determines if a given thread is in a continuation-callback.

Typical synchronous call stacks in an async program are shown below for C++(Table 1), Javascript (Table 2), and C# (Table 3). A live debugger running on a developer's machine (with PDBs) and the error-report gatherer running on a user-machine (without PDBs) both need to identify whether the synchronous call stack looks like these examples and, if so, then the live debugger and the error-report gatherer need to find the relevant task/promise.

TABLE 1

| C++ | |
|---|---|
| normal synchronous stackframes | [user-code] |
| chore->Concurrency::task<T>::_ContinuationTaskHandle<T,U,F>::_Continue | [ppltasks.h] |
| chore->Concurrency::task<T>::_ContinuationTaskHandle<T,U,F>::_Perform | [ppltasks.h] |
| chore->Concurrency::details::_PPLTaskHandle<...>::operator( ) | [ppltasks.h] |
| Concurrency::details::_UnrealizedChore::_InvokeBridge<...>(chore) | [msvcr110] |
| Concurrency::details::_TaskCollection::_RunAndWait(chore) | |
| [on the PPL threadpool, instead of the final _RunAndWait, this is found: | [msvcr110] |
| Concurrency::details::_UnrealizedChore::_UnstructuredChoreWrapper(chore) | [msvcr110] |
| Concurrency::details::_UnrealizedChore::_Invoke( ) | |

For an implementation in C++, the first task is to find the current chore.

The live-debugger, for example, can look for the method _InvokeBridge< . . . > in the synchronous call stack, and "chore" will be its first argument that can be read from EBP.

For error-report gathering this will not work, because _InvokeBridge is a template method that cannot be recognized without PDBs. If the developer already knows the address ranges of the key functions in msvcr110, such as if the developer builds and ships it, then these address ranges may be hard-coded into the code that walks the asynchronous call stack. This list of address ranges will grow with each different build of a program that is shipped.

Given a chore, the corresponding taskImpl is found. With PDBs, then taskImpl can be retrieved from the _M_pTask field. Otherwise, that field's offset is stored inside PDB-Lite so that error-report gatherer can find it:

```
Concurrency::details::_PPLTaskHandle<char,char,Concurrency::details::_Continua
tionTaskHandleBase> *chore;
    offset_within_chore_to_timpl = (byte*)&chore->_M_pTask;
```

TABLE 2

| // Javascript | |
|---|---|
| normal synchronous stackframes | [user-code] |
| promise.notifySuccess | [base.js] |
| promiseState.enter(promise) | [base.js] |
| promise._run | [base.js] |

TABLE 2-continued

| // Javascript | |
|---|---|
| promise._completed | [base.js] |
| promise.onreadystatechange | [base.js] |

For an implementation in Javascript, look in the synchronous call stack for the method WinJS.notifySuccess. If present, this method indicates that it is in the async continuation of a promise. The debugger/error-report gatherer may be made aware of any popular promise library. The notifySuccess method invoked the method from this line:

target._setCompleteValue(on Complete? on Complete (value): value);

The "this" argument of notifySuccess is the promise that just completed. The "target" local variable is the promise that will ultimately be signaled as a result of the synchronous code completing. Both variables are necessarily still live and not garbage collected.

TABLE 3

| // C# | |
|---|---|
| normal synchronous stackframes | [user-code] |
| sm.MoveNext( ) | [user-code] |
| AsyncMethodBuilderCore.InovkeMoveNext(sm) | [mscorlib] |
| ExecutionContext.RunInternal | [mscorlib] |
| ExecutionContext.Run | [mscorlib] |
| AsyncMethodBuilderCore.MoveNextRunner.Run | [mscorlib] |

For an implementation in .NET, look up the synchronous call stack for an instance method void MoveNext( ). If it is inside a class with the attribute [IAsyncStateMachine], then the program is potentially in an asynchronous call stack, and the "this" pointer will identify the state-machine class.

Look up the synchronous call stack one further level. If it is a method with the attribute [AsyncStateMachine( . . . )], then the program is not actually in an async callback. Instead, it is just in the synchronous pre-amble of an async method, and in this case continues a conventional stack-walk.

Otherwise, the program is in an async callback, and a reference to an instance of the state-machine class is in the "this" argument to the MoveNext method. The relevant task is in it:

this.$Builder.m_Task

In the third step, the asynchronous call stack process identifies a task's logical parent.

Referring to Table 4, the left column shows a typical idiom for using async (written by end-users or library-authors). The right column shows the logical parent.

TABLE 4

| VB/C# Async methods | |
| --- | --- |
| 1: Async Function A( ) As Task | line ?? [inside Breakpoint] |
| 2:   Await B( ) | line 7 [inside method B] |
| 3: End Function | line 2 [inside method A] |
| 4: | |
| 5: Async Function B( ) As Task | |
| 6:   Await Task.Delay(1) | |
| 7:   Breakpoint( ) | |
| 8: End Function | |

For an implementation in .NET, given a task "t", then the field t.m_continuationObject is a list of all continuation delegates that will be executed when it completes. This might be just a normal delegate signed up with .ContinueWith (similar to .then( ) in C++/Javascript). But if a method is awaiting the task, then the delegate's _target field will be an object of type
   System.Runtime.CompilerServices.AsyncMethodBuilderCore+MoveNextRunner.

In this case, the m_stateMachine field is used. This is a reference to the state-machine one level up the asynchronous call stack. In the example of Table 4, if starting with statemachine-for-B, then the next one up the asynchronous call stack will be statemachine-for-A.

Table 5 illustrates implementations in C++ and Javascript.

TABLE 5

| C++/JS async methods (either returning last-task-in-chain, or a new task) | | |
| --- | --- | --- |
| 1: void A( ) | 1: function A( ) { | line ?? inside Breakpoint |
| 2: { | 2:   B( ) | line 10 inside B( ) |
| 3:   B( ).then( [=] { | 3:   .then(function ( ) { | line 3 inside A( ) |
| 4:     ... | 4:     ... | |
| 5:   }); | 5:   }); | |
| 6: } | 6: } | |
| 7: | 7: | |
| 8: task<void> B( ) | 8: function B( ) { | |
| 9: { | 9:   WinJS.Promise.timeout(10) | |
| 10:   return delay(10).then( [=] { | 10:     .then(function ( ) { | |
| 11:     Breakpoint( ); | 11:       Breakpoint( ); | |
| 12:   } | 12:     }); | |
| 13: } | 13: } | |
| 14: task<void> C( ) | 14: function C( ) { | line ?? inside Breakpoint |
| 15: { | 15: | line 10 inside B( ) |
| 16:   task_completion_event<void> tce; | 16:   return new WinJS.Promise( | line 18 inside C( ) |
| 17: | 17:     function (c, e, p) { | |
| 18:   B( ).then( [=] { | 18:       B( ).then(function ( ) { | |
| 19:     tce.set( ); | 19:         c( ); | |
| 20:   }); | 20:       }); | |
| 21:   return task<void>(tce); | 21: } | |
| 22: } | | |

For an implementation in C++, given a pointer to a task-impl object "t", its _M_Continuations field is a pointer to a linked-list of continuation objects. For error-reporting, the offset of this field may be stored inside a PDB_Lite segment:

Concurrency::details::_Task_impl<char> *timpl=buf;
   offset_within_timpl_to_continuations =
   (byte*)&timpl_small->_M_Continuations;

Within each continuation object, its _M_pTask field is a pointer to the next task in the chain. The offset of this field was computed earlier: offset_within_chore_to_timpl.

In the first C++ example (left column), if starting at Breakpoint, and tried find the taskimpl that will be returned from B, this algorithm gives us the task-impl associated with A's call to "then( )".

Regarding the second example (right column), what is needed is some way for the debugger to know that the task returned from B( ) will ultimately trigger the task returned from A( ). This is a special case of the section below regarding user-defined combinators.

For an implementation in JS, given a reference to a promise "p", its _listeners field is a list of continuation objects. Within each continuation object, its field "promise" is the next task that will be marked as complete. These fields will necessarily still be live, and not yet garbage collected.

In the first Javascript example (left column), if starting at Breakpoint and try find the promise that will be returned from A, this algorithm gives us the promise associated with A's call to "then( )".

Javascript here is exactly the same as C++. And like C++, its second case may be considered a special case of combinators discussed below.

TABLE 6

| Multiple things awaiting a task | |
| --- | --- |
| 23: auto t = B( ); | line ?? inside Breakpoint |
| 24: A1(t); | line 10 inside B( ) |

TABLE 6-continued

| Multiple things awaiting a task | |
| --- | --- |
| 25: A2(t); | line 28 inside A1( ) |
| 26: | and also line 35 inside |
| 27: void A1(task<void> B) { | A2( ) |
| 28:   t.then( [=] { | |
| 29:     ... | |
| 30:   }) | |
| 31: } | |
| 32: | |
| 33: void A2(task<void> B) | |

TABLE 6-continued

Multiple things awaiting a task

```
34: {
35:   t.then( [=] {
36:     ...
37:   })
38: }
```

For a .NET implementation, a task's m_continuationObject might be a List<object> containing other continuation objects. In this case, use the same techniques as above for each individual one.

For a C++ implementation, a taskimpl's _M_Continuations field is a pointer to a linked-list of continuation objects. From each continuation object, there's a pointer to the next one is in the field "_M_next". For error-reporting, this field's offset is stored:

```
Concurrency::details::_PPLTaskHandle<char,char,Concurrency::details::
    _ContinuationTaskHandleBase> *chore;
offset_within_chore_to_nextchore = (byte*)&chore->_M_next;
```

For a Javascript implementation, a promise's _listeners field is always a list of continuation objects. The techniques above can be used for each element of this list.

TABLE 7

Combinators (methods that takes in zero or more lambda/tasks, and return a task)

```
39: void async_for_each_i(IVectorView<T>^ list, _Function&         line ?? in Breakpoint
    asyncfunc,                                                      line 10 in B( )
40:              int i, task_completion_event<void> tce)            line 44 in
41: {                                                                  async_for_eachi( )
42:   if (i==list->Size) { tce.set( ); return; }                    line 51 in
43:   T item = list->GetAt(i);                                         async_for_each( )
44:   asyncfunc(i, item).then( [=]( ) {                             line 58 in A( )
45:     async_for_each_i(list, asyncfunc, i+1, tce);
46:   });
47: }
48:
49: task<void> async_for_each(IVectorView<T>^ list, _Function&
    asyncfunc)
50: {
51:   task_completion_event<void> tce;
52:   async_for_each_i(list, asyncfunc, 0, tce);
53:   return task<void>(tce);
54: }
55:
56: void A( )
57: {
58:   async_for_each( [=] {
59:     return B( );
60:   }
61: }
62: Async Function A( ) As Task                                     line ?? in Breakpoint( )
63:   Dim t = B( )                                                   line 10 in B( )
64:   Await Task.WhenAll(t, t2)                                     line ?? in
65: End Function                                                        Task.WhenAll( )
                                                                     line 64 in A( )
```

Combinators are used regularly in async programming. Almost all combinators are written using TaskCompletionSource (.NET) or task_completion_event (C++) or WinJS.Promise.constructor (JS). Some common combinators are:

.NET: Task.WhenAll, Task.WhenAny
JS: .then( ), every WinRT function, WinJS.Promise.timeout, WinJS.xhr, WinJS.Promise.join, setTimeout, XHR
C++: .then( ), creat_task( ), when_all Some combinators return promise objects themselves (e.g., all of .NET, and all of WinJS, and all uses of WinRT within Javascript). The older non-compositional ones do not (e.g., setTimeout, XHR). This section only addresses the promise-returning tasks, since the non-compositional ones do not have a notion of "parent task".

For a .NET implementation, a Task will invoke its m_action field, passing its m_stateObject as argument. Examine the objects m_action._target (if it was an instance delegate), and m_stateObject, looking for fields of type TaskCompletionSource. For each such field, look at its m_task field. This is the "logical parent task" that the delegate has the power to unblock.

For a Javascript implementation, look at the function object associated with each Javascript chore. For each function, look at the [[Scope]] pseudo-object for all functions which are the completion/error delegates of a WinJS promise object. From them, retrieve the promise object.

For a C++ implementation, look at the functor associated with each C++ chore. A mechanism in PDB-lite may be adapted to recognize special functors, including template functors. One solution is to expect functors to implement a certain interface. Another solution is to extend ppl to work with void-typed functor methods, which can be registered in PDB-lite. Another solution, applicable only at design-time, is to use the full PDB to recognize functors.

In some embodiments of the third step, given a task/promise, the asynchronous call stack process optionally identifies threads that are synchronously blocked on the task/promise.

TABLE 8

| | |
|---|---|
| 1: Sub Main( ) | line ?? in Breakpoint( ) |
| 2:   B( ).Wait( ) | line 7 in B( ) |
| 3: End Sub | line ?? in System.Monitor.Wait( ) |
| 4: | line 2 in Main( ) |
| 5: Async Function B( ) As Task | |
| 6:   Await Task.Delay(1) | |
| 7:   Breakpoint( ) | |
| 8: End Function | |

In the code shown in Table 8, the Main thread is synchronously blocked until the task returned by MainAsync has completed. A developer would want the asynchronous call stack to display this. In other words, given a task, find all conventional synchronous stackframe that are blocked on it.

For .NET, of the continuation delegates on a task, check if any of them have a target of type System.Threading.Tasks.Task+SetOnInvokeMres. If so, obtain the m_lock field of that target. This object is the Monitor that some other thread may be blocked on. Next, iterate through the list of threads in the process, and for each thread iterate over the objects that it is currently blocked on. For any thread blocked on the object, then this thread's bottom-stack-frame may be listed in the asynchronous call stack window.

In a fourth step, given a task/promise, the asynchronous call stack process identifies the corresponding line number and, optionally, a local-variable-closure.

For .NET, given a reference to a state-machine object, retrieve its $State field (an integer). Next, iterate through the IL of the MoveNext to find the last switch($State) {case x:goto A; . . . } statement that has a "case" corresponding to the current value of the state field. The line-number to display is the one of the "goto" target. The local-variables to display are all the local variables that have been lifted into the async state machine.

For C++, given a taskimpl, retrieve its _M_pTaskCreationHint field. This is an instruction address. For purposes of error-reporting, store the offset of this field into PDB-Lite:

```
Concurrency::details::_Task_impl<char> * timpl;;
offset_within_timpl_to_address =
    &timpl->_M_pTaskCreationAddressHint;
```

Given a taskimpl, if one of the continuations of the timpl is a lambda, and it's at the same line number in code, then display the captured variables of that lambda.

For Javascript, in one embodiment, a field is added to WinJS.Promise that contains the line-number at which it was created. This would function the same as _M_pTaskCreationHint.

In another embodiment, to find a task's line-number without modifying WinJS, look for the task's listeners and display the line number of one of them. This would be acceptably close for users who use promise.then(lambda).

Given a promise, if one of the listeners is a lambda, then find the closure-frame of that lambda and from it find the parent closure-frame. If the lambda mentions any variables, then they will still be live and not yet garbage collected and can be displayed. If it doesn't, then there's no way to retrieve those variables.

In some embodiments of the fourth step, given a task/promise, the asynchronous call stack process optionally retrieves the asynchronous call stack at its time of creation.

TABLE 9

| | | |
|---|---|---|
| Async Function A( ) As Task | If the call stack is saved at time of task-creation, then display | If the call stack is not saved, then display the following |
|   Await Helper( ) | | Breakpoint( ) |
| End Function | Breakpoint( ) | B( ) |
| Function Helper( ) As Task | B( ) | A( ) |
|   Return B( ) | Helper( ) | |
| End Function | A( ) | |
| Async Function B( ) As Task | | |
|   Await Task.Delay(10) | | |
|   Breakpoint( ) | | |
| End Function | | |

The techniques discussed above have described how to walk the task/promise asynchronous call stack—going from each task to its next parent task. In the code of Table 9, they would go from B( ) straight up to A( ) because no record had been kept (or was needed) that there was a non-async Helper function along the way.

For C++, upon task-creation, rather than storing void* in _M_CreationAddressHint, store a list of void* pointers obtained by walking up the stack frame.

For Javascript, the causality-chain idea requires call stacks to be saved at time of task creation.

Figure 4:
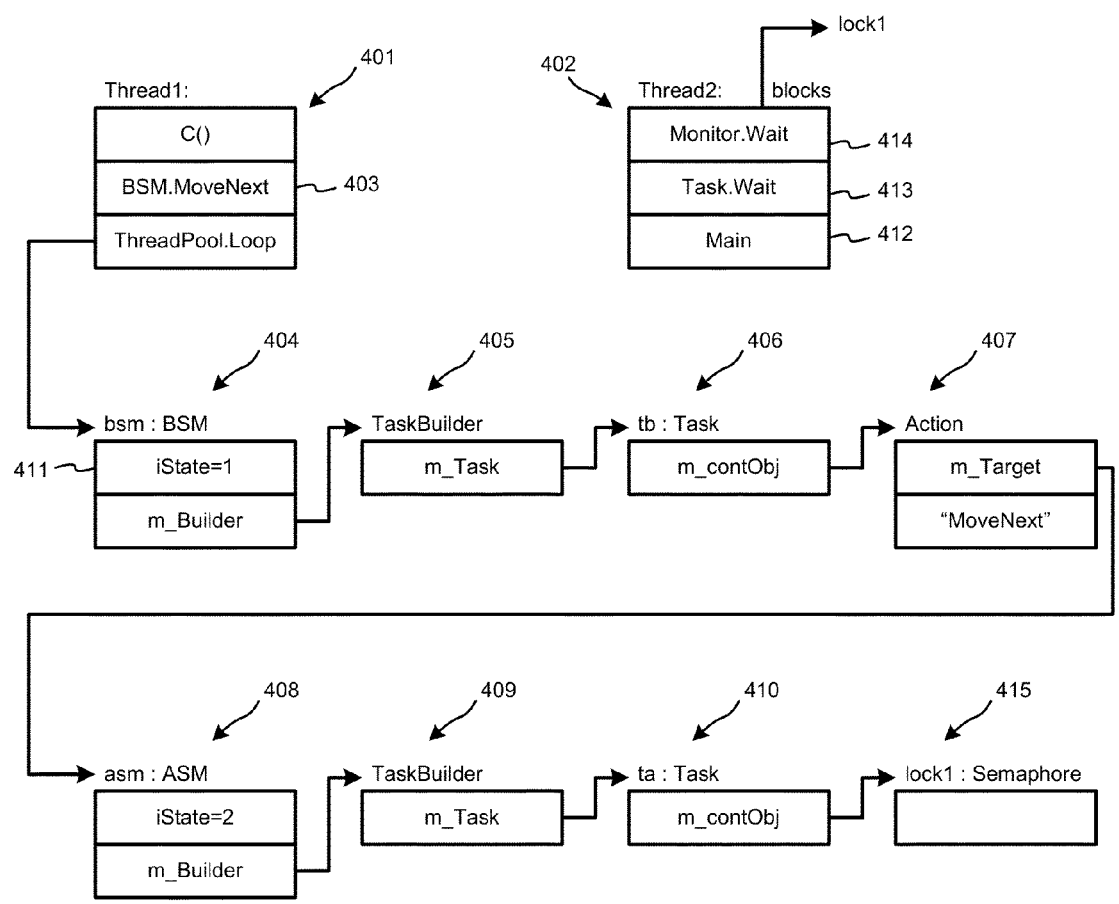
FIG. 4 illustrates the heap and call stacks when an exception is thrown in C.

The code in Table 10 and FIGS. 2-4 illustrates one embodiment of the invention in C# and Visual Basic® on the .NET platform. Table 10 is an example of user code written with asynchronous functions.

TABLE 10

| User's code: | Compiler output: |
|---|---|
| void Main( ) { | Task A( ) { |
|     var ta = A( ); | var sm = new ASM( ); |
|     ta.Wait( ); | sm.sc = SyncContext.Current; |
| } | sm.MoveNext( ); |
| async Task A( ) { | return sm.m__Builder.m__Task; |
|     await Task.Yield( ); | } |
|     string s; | class ASM { |
|     var tb = B( ); | int iState; |
|     await tb; | TaskBuilder m__Builder; |
| } | SyncContext sc; |
| async Task B( ) { | string s; |
|     await Task.Yield( ); | Task tb; |
|     C( ); | void MoveNext( ) { |
| } | switch (iState) { |
| void C( ) { | case 0 : |
|     throw new Exception( ); | // ... |
| } | case 1: |
| | // ... |
| | var tmp = tb.GetAwaiter( ); |
| | if (!tmp.IsCompleted) { |
| | tmp.OnCompleted(( ) => |
| | sc.Post(this.MoveNext)); |
| | return; |
| | } |
| | case 2: |

TABLE 10-continued

| User's code: | Compiler output: |
|---|---|
| | tmp.GetResult( ); |
| | // ... |
| | m__Builder.SetResult( ); |
| | }}} |

When the user's code (left column of Table 10) is invoked, Main calls function A, which calls function B, which calls function C. Functions A and B are asynchronous functions. When the program is executed, the program starts and invokes function A. The first line of function A is to await Task .Yield( ). This registers to come back and finish the rest of function A—starting with the line "string s;"—when the program is ready. The program then starts function B. The program will again await until function B is finished. When B is invoked, it registers its continuation that when the Task .Yield( ) finishes, then task C executes. When C executes it throws an exception.

For purposes of this example, assume that the program runs up to the point where an exception is thrown at task C. Either a debugger breaks in on a developer machine or an error report gatherer collects a crash dump on a user machine at this point. FIG. 2 illustrates the call stack 201 available when the exception occurs in C. This shows that the function C was invoked by BSM.MoveNext, which was invoked called by ThreadPool.Loop. The traditional synchronous call stack will not show a connection to function A. On its own, this information 201 is not very useful to a developer who is debugging the program or analyzing a crash dump.

FIG. 3 illustrates the type of asynchronous call stack information that the developer would like to see. The asynchronous call stack 301 starts with function C( ), which has thrown the exception, and shows the stack back to Main( ).

FIG. 4 illustrates the heap and synchronous call stacks when the exception is thrown in C. This information can be used to generate the desired asynchronous call stack 301 shown in FIG. 3.

To generate the asynchronous call stack, a first step is to identify all threads and all outstanding tasks that have not yet completed. These threads include Thread 1 401 and Thread2 402.

A second step is to identify whether a given thread is inside a continuation-callback, and if so find the corresponding task/promise. In this example, referring to Thread1 401, the level BSM.MoveNext 403 is recognized as being inside a task. Following the arrows to state machine bsm:BSM 404, then to TaskBuilder 405, and then to tb:Task 406, this combination can be used to find the corresponding task and state machine for a continuation-callback from the traditional synchronous call stack 401.

In a third step, given a task/promise, identify the logical parent task/promise. This means that given the task or state machine corresponding to B, find the task or state machine corresponding to A. This is accomplished by following the arrows from tb:Task 406 to Action 407 and from there to state machine asm:ASM 408. From there, continue following the arrows to TaskBuilder 409 and ta:Task 410 to identify the logical parent task.

In a fourth step, given a task/promise, identify the corresponding line number. This may be accomplished, for example, using the state of BSM 404 (i.e., iState=1 411). Looking inside BSM for iState=1, which is an index to the await that the program is currently on. So, by feeding the BSM state machine into the PDB, the PDB can be used to convert the index into a line number.

Using the information collected in the four steps described above, the asynchronous call stack 301 is generated and displayed to the user.

Additional information may also be collected from the heap and traditional synchronous call stacks illustrated in FIG. 4. For example, given a task/promise, threads that are synchronously blocked on the task/promise may be identified.

FIG. 4 illustrates two threads of execution. For example, Thread2 402 was in the process Main 412 and then called into process Task.Wait 413 and then called into process Monitor-.Wait 414. Then Thread2 402 was blocked until a monitor, semaphore or mutex is marked as completed.

Referring to ta:Task 410, there is a loop that indicates that when the task is finished, then lock1 415, which may be a monitor, semaphore, or mutex, has finished. When this object in memory is marked as finished, it will allow Thread 2 402 to start executing. By following this path from ta:Task 410 to lock1 415 to Thread2 402, then Thread2 402 can be identified as the logical parent for ta:Task 410.

Table 11 is code used to illustrate an example Javascript embodiment.

TABLE 11

```
function fooAsync(url) {
    var data, file;
    DownloadAsync(url) // use the label "PD" for the result result of this
    async operation
    .then(function X(d) { data=d; OpenFileAsync( ); } // let "P2" be the
    result of this .then( )
    .then(function Y(f) { file=f; file.WriteFileAsync(data); } // let "P3"
    be the result
}
```

Figure 5:
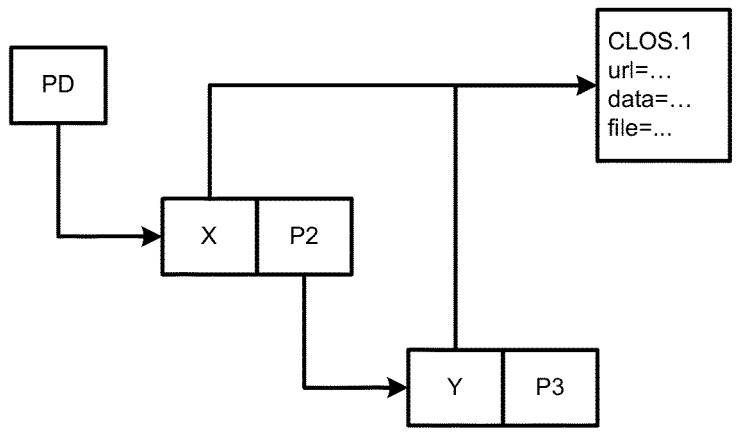
FIG. 5 shows a heap after a function has returned in one embodiment of the code.
Figure 6:
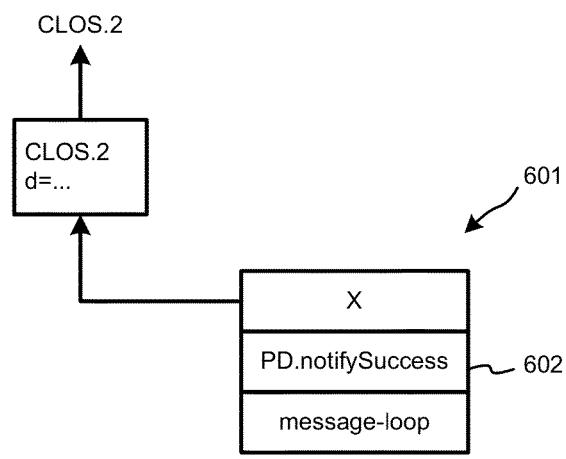
FIG. 6 illustrates the step of one embodiment.

FIG. 5 shows what the heap looks like after fooAsync( ) has returned in one embodiment of the code in Table 11. FIG. 6 shows the synchronous call stack when the code hits a breakpoint on "data=d".

In the first step, all threads and all outstanding tasks which have not yet been completed are identified. The program is in side function X, which has not yet completed.

FIG. 5 illustrates how, given a task/promise, the logical parent task/promise is identified. Starting with the promise PD, a pointer can be followed to P2 and another pointer can be followed to P3. This shows that the P3 is the logical parent of P2, and that P2 is the logical parent of PD.

FIG. 6 illustrates the second step (identify whether the thread is inside a continuation-callback and, if so, find the corresponding task/promise) and an optional step (identify the local-variable-closure) in one embodiment. Call stack 601 shows function X along with some information that is not useful to the developer. However, the PD.notifySuccess level 602 allows the corresponding task to be discovered.

Figure 7:
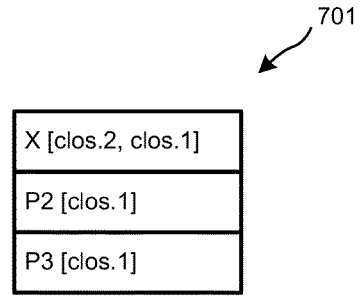
FIG. 7 is an asynchronous call stack that can be shown to the user when the breakpoint was hit.

FIG. 7 is an asynchronous call stack that can be shown to the user when the breakpoint was hit. Asynchronous call stack 701 is constructed from the pointers in FIGS. 5 and 6. Asynchronous call stack 701 also indicates the local variables (closure) that would be shown if the user selected on any line.

As indicated by FIGS. 2-7 and the related discussion above, a different set of arrows are followed in each language or library to construct the asynchronous call stack. However, these arrows necessarily exist, otherwise the program would not resume correctly when the operation that is being waited on finally finished.

Depending upon the type of program and language used, there are a variety of places where threads and outstanding tasks that have been completed may be found. As noted above, all of the threads can be examined to identify all of the things that are currently being executed. Also, by walking the heap, you can identify all tasks and promise objects that have been created. Other areas may also be reviewed to find registered code that will later be executed. For example, in a Windows® application, the Windows® message queue includes code that is registered for later execution. Other platforms, such as Javascript, also have their own queue where code can be registered. Instead of running code directly, in some embodiments, delegates may be registered in a language-specific queue, such as .NET thread pool queue, a C++ queue, a Javascript queue, or similar queue.

FIG. 8 is a flowchart of a method or process 800 for generating an asynchronous call stack for an asynchronous program. In step 801, identify all threads and all outstanding tasks that have not yet been completed. In other embodiments, all outstanding continuation-delegates that are in the windows queue waiting to be scheduled are identified. Additionally, all outstanding delegates in a language-specific queue are also identified.

In step 802, identify whether a given thread is inside a continuation-callback and, if so, find a task corresponding to the invocation of the callback. In step 803, given a task/promise, identify the logical parent task/promise. In other embodiments, given a delegate, the logical parent task/promise is identified. Alternatively, given a task/promise, the threads that are synchronously blocked on the task/promise are identified.

In step 804, given a task/promise, identify the corresponding line number. In other embodiments, the local-variable-closure is also identified. Also, the synchronous call stack at time of task/promise creation may be retrieved. In step 805, a sequence of tasks and source code locations corresponding to the given task and the logical parent is displayed.

Figure 9:
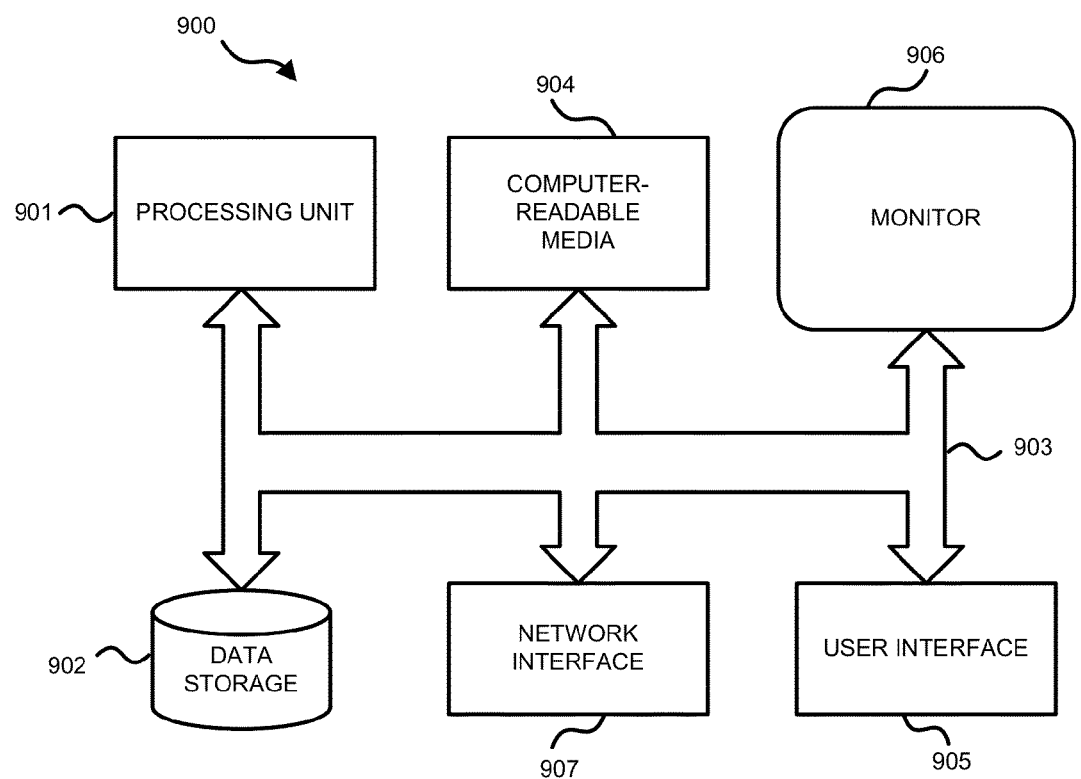
FIG. 9 illustrates an example of a suitable computing and networking environment according to one embodiment.

FIG. 9 illustrates an example of a suitable computing and networking environment 900 on which the examples of FIGS. 1-8 may be implemented to generate asynchronous call stacks for analysis of asynchronous programs. The computing system environment 900 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an exemplary system for implementing various aspects of the invention may include a general purpose computing device in the form of a computer 900, which may be, for example, a developer machine or a user machine. Components may include, but are not limited to, various hardware components, such as processing unit 901, data storage 902, such as a system memory, and system bus 903 that couples various system components including the data storage 902 to the processing unit 901. The system bus 903 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 900 typically includes a variety of computer-readable media 904. Computer-readable media 904 may be any available media that can be accessed by the computer 900 and includes both volatile and nonvolatile media, and removable and non-removable media, but excludes propagated signals. By way of example, and not limitation, computer-readable media 904 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 900. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 902 includes computer storage media in the form of volatile and/or nonvolatile memory such as read only memory (ROM) and random access memory (RAM). A basic input/output system (BIOS), containing the basic routines that help to transfer information between elements within computer 900, such as during start-up, is typically stored in ROM. RAM typically contains data and/or program modules that are immediately accessible to and/or presently being operated on by processing unit 901. By way of example, and not limitation, data storage 902 holds an operating system, application programs, and other program modules and program data.

Data storage 902 may also include other removable/non-removable, volatile/nonvolatile computer storage media. By way of example only, data storage 902 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 9, provide storage of computer-readable instructions, data structures, program modules and other data for the computer 900.

A user may enter commands and information through a user interface 905 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 901 through a user input interface 905 that is coupled to the system bus 903, but may be connected by other interface and bus structures, such as a parallel port, game port or a universal serial bus (USB). A monitor 906 or other type of display device is also connected to the system bus 903 via an interface, such as a video interface. The monitor 906 may also be integrated with a touch-screen panel or the like. Note that the monitor and/or touch screen panel can be physically coupled to a housing in which the computing device 900 is incorporated, such as in a tablet-type personal computer. In addition, computers such as the computing device 900 may also include other peripheral output devices such as speakers and printer, which may be connected through an output peripheral interface or the like.

The computer 900 may operate in a networked or cloud-computing environment using logical connections 907 to one or more remote devices, such as a remote computer. The remote computer may be a personal computer, a server, a router, a network PC, a peer device or other common network node, and typically includes many or all of the elements described above relative to the computer 900. The logical connections depicted in FIG. 9 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 900 may be connected to a public or private network through a network interface or adapter 907. In some embodiments, a modem or other means for establishing communications over the network. The modem, which may be internal or external, may be connected to the system bus 903 via the network interface 907 or other appropriate mechanism. A wireless networking component such as comprising an interface and antenna may be coupled through a suitable device such as an access point or peer computer to a network. In a networked environment, program modules depicted relative to the computer 900, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. In a computer system having a processor and a memory coupled to the processor, the memory having instructions stored thereon that, upon execution by the processor, configure the computer system to obtain an asynchronous call stack, a method comprising:
   identifying a plurality of outstanding tasks in a program, which have not yet been completed;
   identifying, based upon the plurality of outstanding tasks, a plurality of outstanding continuation-delegates that are in a platform-specific queue;
   identifying, among the plurality of outstanding continuation-delegates that are in the platform-specific queue, a plurality of outstanding continuation-delegates that are in a language-specific queue;
   determining whether a given one of a plurality of threads is inside a given one of the plurality of outstanding continuation-delegates in the language-specific queue;
   identifying, for the given thread, a given one of the plurality of outstanding tasks corresponding to the given one of the plurality of outstanding continuation-delegates in the language-specific queue;
   identifying a logical parent task for the given task;
   identifying a source code location in the program corresponding to the given task; and
   displaying a sequence of source code portions and source code locations corresponding to the given task and the logical parent task.

2. The method of claim 1, further comprising:
   identifying a logical parent task for a selected delegate.

3. The method of claim 1, further comprising:
   identifying threads that are synchronously blocked on a selected task.

4. The method of claim 1, further comprising:
   identifying the corresponding local-variable-closure for the given task.

5. The method of claim 1, further comprising:
   storing and later retrieving a synchronous call stack at a time of task creation.

6. The method of claim 1, wherein the method is performed by a debugger tool running on a developer's computer.

7. The method of claim 1, wherein the program is running on a user's computer, and further comprising:
   identifying task and asynchronous call stack information using an error-report gathering application.

8. A computer system, comprising:
   a processor; and
   a memory coupled to the processor, the memory having instructions stored thereon that, upon execution by the processor, cause the computer system to:
   identify a plurality of outstanding tasks in a program that have not yet been completed;
   identify, based upon the plurality of outstanding tasks, a plurality of outstanding continuation-delegates that are in a platform-specific queue;
   identify, among the plurality of outstanding continuation-delegates that are in the platform-specific queue, a plurality of outstanding continuation-delegates that are in a language-specific queue;
   determine whether a given one of a plurality of threads is inside a given one of the plurality of outstanding continuation-delegates in the language-specific queue;

identify, for the given thread, a given one of the plurality of outstanding tasks corresponding to the given one of the plurality of outstanding continuation-delegates in the language-specific queue;
identify a logical parent task for the given task;
identify a source code location in the program corresponding to the given task; and
display a sequence of source code portions and source code locations corresponding to the given task and the logical parent task.

9. The computer system of claim 8, wherein the instructions, upon execution by the processor, further cause the computer system to:
identify threads that are synchronously blocked on a selected task.

10. The computer system of claim 8, wherein the instructions, upon execution by the processor, further cause the computer system to:
identify the corresponding local-variable-closure for a given task.

11. The computer system of claim 8, wherein the instructions, upon execution by the processor, further cause the computer system to:
store and later retrieve a synchronous call stack at a time of task creation.

12. A computer-readable storage medium storing computer-executable instructions that when executed by at least one processor of a computer system cause the computer system to:
identify a plurality of outstanding tasks in a program that have not yet been completed;
identify, based upon the plurality of outstanding tasks, a plurality of outstanding continuation-delegates that are in a platform-specific queue;
identify, among the plurality of outstanding continuation-delegates that are in the platform-specific queue, a plurality of outstanding continuation-delegates that are in a language-specific queue;
determine whether a given one of a plurality of threads is inside a given one of the plurality of outstanding continuation-delegates in the language-specific queue;
identify, for the given thread, a given one of the plurality of outstanding tasks corresponding to the given one of the plurality of outstanding continuation-delegates in the language-specific queue;
identify a logical parent task for the given task;
identify a source code location in the program corresponding to the given task; and
identify a sequence of source code portions and source code locations corresponding to the given task and the logical parent task.

13. The computer-readable storage medium of claim 12, further comprising:
determining whether the given thread was invoked by a continuation-callback; and
for a thread that was invoked by a continuation-callback, identify a task corresponding to the callback.

* * * * *